(12) United States Patent
Kobayashi et al.

(10) Patent No.: US 7,590,335 B2
(45) Date of Patent: Sep. 15, 2009

(54) DIGITAL CAMERA, COMPOSITION CORRECTION DEVICE, AND COMPOSITION CORRECTION METHOD

(75) Inventors: Masao Kobayashi, Nagano (JP); Kazuyasu Kurata, Nagano (JP); Hirokazu Nakazawa, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 403 days.

(21) Appl. No.: 11/536,226

(22) Filed: Sep. 28, 2006

(65) Prior Publication Data
US 2007/0223900 A1    Sep. 27, 2007

(30) Foreign Application Priority Data
Mar. 22, 2006  (JP)  .............................. 2006-079770

(51) Int. Cl.
| | |
|---|---|
| G03B 17/00 | (2006.01) |
| G03B 17/18 | (2006.01) |
| G03B 17/20 | (2006.01) |
| G06K 9/36 | (2006.01) |

(52) U.S. Cl. ........................ 396/50; 396/287; 396/296; 348/333.03; 382/289

(58) Field of Classification Search .................. 396/50, 396/54, 439, 287, 296; 348/207.99, 208.2, 348/208.14, 222.1, 335, 333.03; 382/286, 382/289

See application file for complete search history.

(56) References Cited

FOREIGN PATENT DOCUMENTS

JP        2003-219239        7/2003

OTHER PUBLICATIONS

Translation of JP 2003-219239.*

* cited by examiner

*Primary Examiner*—Rochelle-Ann J Blackman
(74) *Attorney, Agent, or Firm*—Pamela R. Crocker

(57) ABSTRACT

When composition of a first captured image having a tilted subject image is corrected, the first image is rotated such that the subject image stands in an erect position, according to the attitude of the camera achieved during capture of the first image. Images corresponding to missing portions, which arise in the image area for recording due to rotation, are extracted from a second captured image as compensation images. The second image is obtained by capturing an image of the same subject as that captured by the first image, at the different angle of view and attitude of the camera. An image obtained by enlarging the compensation images extracted from the second image according to the angle of view employed for capturing the first image is synthesized with the rotated first image, to thus make the subject image stand in an erect position and to obtain a corrected image without involving a decreased number of pixels.

10 Claims, 14 Drawing Sheets

DIGITAL CAMERA, COMPOSITION CORRECTION DEVICE, AND COMPOSITION CORRECTION METHOD

CROSS REFERENCE TO RELATED APPLICATIONS

This application claims priority to Japanese Patent Application No. 2006-079770 filed on Mar. 22, 2006, which is incorporated herein by reference in its entirety.

BACKGROUND OF THE INVENTION

1. Field of the Invention

The present invention relates to a digital camera for electronically recording an image, a composition correction device for subjecting an image captured by the digital camera to composition correction processing, and a composition correction method.

2. Related Art

A digital camera, which electronically records an image, allows easy correction or modification of the image captured through image capturing operation. Hence, the digital camera is currently in wide use. One of image correction operations performed by the digital camera is correction of a composition.

For instance, a recording range of a captured image is essentially rectangular. A common photograph is preferably captured with a composition where a longer or shorter side of the rectangular area is likened to a horizontal line and a subject stands in an erect position in relation to the longer or shorter side. Consequently, in ordinary cases, a photographer performs image capturing operation while visually ascertaining the angle of the subject within a viewfinder in such way that the above composition is achieved. However, in this case, a determination as to whether or not the subject stands in an erect position is dependent on human perception. Hence, the determination is not necessarily accurate. Moreover, when the image of a moving object, or the like, is hastily captured, such a composition cannot be ascertained in detail. Consequently, there may be a case where the image of the subject is captured in a non-erect position or with a composition which is not originally intended by the photographer. In such a case, there has already been known a method for correcting the captured image by means of rotating the image such that the subject stands in an erect position.

For instance, Japanese Patent Laid-Open Publication No. 2003-219239 discloses a camera which detects the attitude of the camera during image capturing by means of an attitude sensor provided in the camera; and which rotates the captured image in accordance with the detected attitude angle. In this camera, an image capture area where an image is actually captured is made slightly larger than a recording area which is to be recorded as a captured image. Therefore, even when a captured image is rotated, a missing portion is prevented from arising in the image in the recording area. Such a camera enables capture of an image of an erect subject even when the image of the subject has been captured with the camera being tilted.

However, the technique described in Japanese Patent Laid-Open Publication No. 2003-219239 encounters a problem of a reduction in the number of pixels of a captured image as compared with the number of pixels originally captured by the camera. Specifically, the recording area of a recording image is made smaller than the image capture area. Therefore, Japanese Patent Laid-Open Publication No. 2003-219239 presents a problem of a finally-captured image being of lower definition than an image captured in a case where the image capture area is made equal to the recording area. Put another way, the technique disclosed in the Patent Publication raises a problem of an inability to sufficiently utilize the performance of the camera.

SUMMARY OF THE INVENTION

The present invention provides a camera which provides a composition intended by the user while maintaining definition, as well as a composition correcting device and a composition correcting method.

The present invention provides a digital camera comprising:

first captured image obtaining means for acquiring a first captured image by capturing an image of a subject at a predetermined angle of view;

second captured image obtaining means for acquiring a second captured image by means of capturing an image of a subject identical with the subject while at least one of the image capturing angle of view and a attitude of the camera is changed from its counterpart used for capturing the first captured image;

attitude detection means for detecting the attitude of the camera during image capture operation;

rotation processing means for rotating the first captured image in order to make an image of the subject in the first captured image stand in an erect position, on the basis of the attitude detected at the time of capture of the first captured image; and compensation means for compensating for missing portions where portions of the image are absent in a predetermined image recording range due to rotation of the first captured image, on the basis of the second captured image.

In a preferred mode, the second captured image obtaining means captures an image at an angle which is wider than that used for capturing the first captured image, to thus acquire the second captured image. In this case, the compensation means desirably extracts the image of the subject corresponding to the missing portions from the second captured image as a compensation image, and desirably compensates for the missing portions with images which are formed by enlarging the compensation image according to the image capturing angle of view employed for capturing the first captured image.

In another preferred mode, the second captured image acquisition means performs image capture operation with the attitude of the camera at which the image of the subject stands in an erect position, to thus acquire the second captured image. In this case, the digital camera preferably further comprises grid line display means for displaying grid lines, whose attitude angle changes in accordance with a detection result output from the attitude detection means, in conjunction with a preview screen. Further, the digital camera preferably comprises first captured image display means for displaying, along with a preview screen, a first captured image that has been rotated by the rotation processing means in such a way that the image of the subject stands in an erect position.

In still another preferred mode, the first captured image obtaining means and the second captured image obtaining means are identical image capture means, and the first captured image and the second captured image are images which have been captured with a time difference.

In yet another preferred mode, the first captured image obtaining means and the second captured image obtaining means are two image capture means which are independently provided in one camera and capable of simultaneously acquiring images of a single subject at different angles of view. The first captured image and the second captured image are images which are simultaneously captured by the two image capture means.

In either of the cases, the shape of an image area for recording is preferably switched between a landscape rectangular shape and a portrait rectangular shape, on the basis of the attitude of the camera employed at the time of capture of the first captured image.

The present invention also provides a composition correction apparatus comprising:

rotation processing means for rotating a first captured image obtained by means of capturing an image of a subject at a predetermined angle of view, on the basis of the attitude detected during capture of the first captured image in order to cause the image of the subject stand in an erect position; and compensation means for compensating for missing portions, where an image is absent in predetermined image recording areas due to rotation of the first captured image, on the basis of a second captured image obtained by capturing an image of a subject identical with that of the first captured image while at least one of an image capturing angle of view and an attitude angle of the camera is changed as compared with its counterpart employed for capturing the first captured image.

The present invention also provides a composition correction method comprising:

a rotation processing step of rotating a first captured image obtained by means of capturing an image of a subject at a predetermined angle of view, on the basis of the attitude detected during capture of the first captured image in order to make the image of the subject stand in an erect position; and a compensation step of compensating for missing portions, where images are absent in predetermined image recording areas due to rotation of the first captured image, on the basis of a second captured image obtained by capturing an image of a subject identical with that of the first captured image while at least one of an image capturing angle of view and an attitude of the camera is changed as compared with its counterpart employed for capturing the first captured image.

According to the present invention, the missing portions are compensated for by the second image captured separately from the first captured image. Consequently, deterioration in image quality of the first captured image or the like does not arise. A composition intended by the user is obtained while definition is maintained.

The invention will be more clearly comprehended by reference to the embodiments provided below. However, the scope of the invention is not limited to those embodiments.

BRIEF DESCRIPTION OF THE DRAWINGS

Preferred embodiments of the present invention will be described in detail by reference to the following figures, wherein.

DETAILED DESCRIPTION OF THE INVENTION

Embodiments of the present invention will be described herein below by reference to the drawings.

Figure 1:
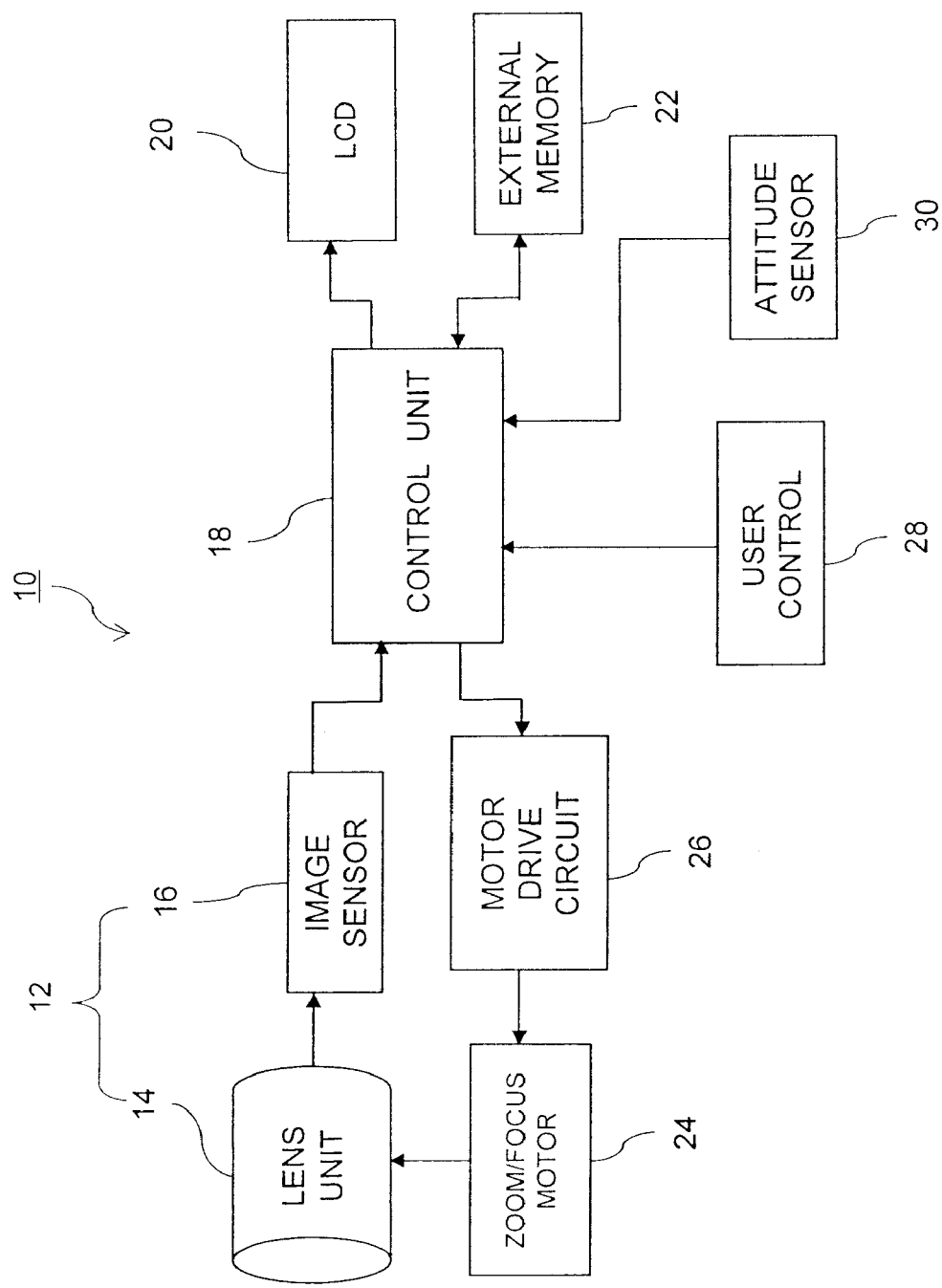
FIG. 1 is a block diagram showing the general configuration of a digital camera according to a first embodiment of the present invention.

FIG. 1 is a block diagram showing the general configuration of a digital camera 10 which is a first embodiment of the present invention. This digital camera 10 is a compact digital camera using a battery (not shown) as a power source. The digital camera 10 is equipped with an image capture unit 12 formed from a lens unit 14 and an image sensor 16. The lens unit 14 is provided with a zoom lens and arranged so as to be able to change the angle of view as appropriate. As in the case of an ordinary lens unit, the lens unit 14 is additionally provided with a shutter assembly, an aperture, and the like.

Light gathered by the lens unit 14 forms an image on the image sensor 16. The image sensor 16 converts the image into an electrical signal to thereby output the signal as image data. In the present embodiment, the image sensor 16 is a single-chip color megapixel CCD sensor, and uses a known Bayer color filter used for capturing a color image. The image sensor 16 has a 4:3 image aspect ratio. Consequently, the image data obtained through image capturing operation also have a 4:3 image aspect ratio.

The image data output from the image sensor 16 are output to a control unit 18. The control unit 18 is formed from a processor, memory, and various types of interfaces. The control unit 18 operates in accordance with firmware stored in firmware memory that is flash EPROM; and executes image capture operation and an image correction function in accordance with an operation signal from the user control 28.

Specifically, the control unit 18 controls the image sensor 16 by means of supplying a signal to a timing generator (not shown), thereby controlling timing for reading an image (sweep-out of electric charges). The control unit 18 sends a control signal to a motor drive circuit 26, to thus drive a zoom/focus motor 24 and control the focusing or zooming operation of the lens unit 14.

The control unit 18 temporarily stores the image data input from the image sensor 16 into image memory (not shown), and subjects the image data to various types of image processing. Image processing to be performed includes γ-correction processing, white balance processing, and the like. Specifics of image processing are the same as those of image processing performed in an ordinary digital camera, and their explanations are omitted herein. In addition to these image-processing operations, the digital camera 10 of the present embodiment additionally performs composition correction processing. The composition correction processing is for automatically correcting the attitude of a subject image in a captured image. Details of the composition correction processing are described in detail later.

An LCD 20 functions as display means for displaying a preview image captured before image capture, image data obtained through image capture, image data captured in the past and recorded in a recording medium, and the like. On the basis of the preview image appearing on the LCD 20, the user ascertains an angle of the captured image and performs image capture action. When image capture action has been performed, display of the preview image is suspended, and an image captured through image capture action is displayed. The user determines whether or not the image capture operation has been successful by means of examining the displayed captured image. The LCD 20 also acts as a user interface for displaying various operation menus. The user operates a user control 28 in accordance with the menu screen displayed on the LCD 20.

An attitude sensor 30 is for detecting the inclination of the camera, and comprises an acceleration sensor, and the like, housed in an enclosure of the camera. The attitude sensor 30 detects the attitude angle, or the like, of the camera with reference to the direction of a plane of an image capture screen; and outputs the detected angle to the control unit 18. When image capture has been performed, the control unit 18 adds the attitude angle of the camera captured during image capture operation as attitude data to the captured image data, and stores the captured image data into image memory or the external memory 22. When performing composition correction processing, the control unit 18 performs rotation processing of the captured image on the basis of the attitude data added to the captured image data. If necessary, grid lines conforming to the attitude angle detected by the attitude sensor 30 are displayed on the LCD 20 along with the preview image. Details of the grid lines will also be described in detail later.

Next will be described in detail composition correction processing performed by the digital camera 10. In the following descriptions, in order to definitely distinguish a yet-to-be-corrected image captured through image capture from an image having been subjected to composition correction processing or the like, the former image is called a "captured image," and the latter image is called a "corrected image." Further, an image area of the captured image is called an "image capture area," and an image area of the corrected image is called an "image area for recording."

Figure 2B:
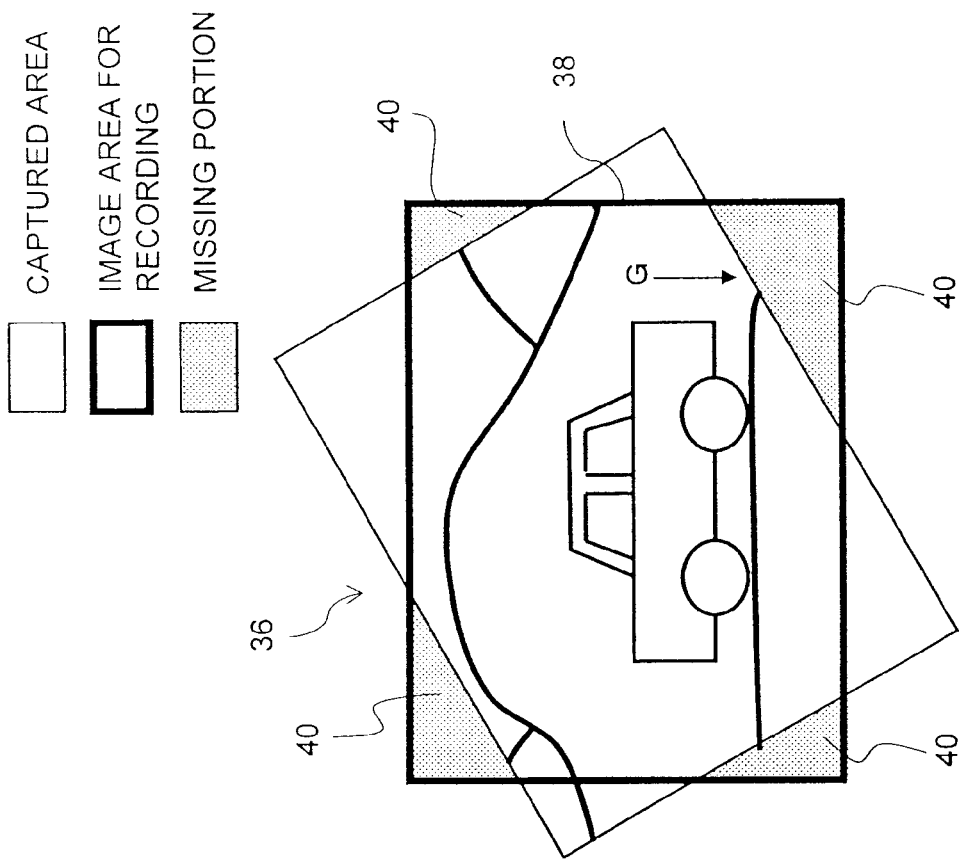
FIG. 2 is a view showing a concept of rotational processing.
Figure 2A:
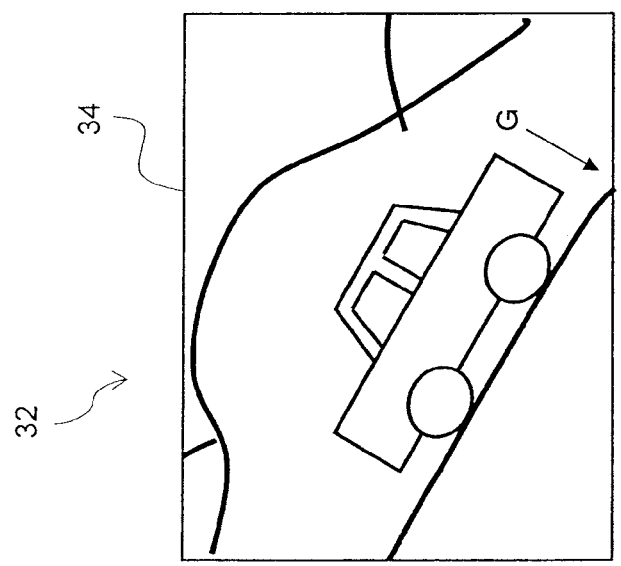

Consideration is now given to a case where the image of the subject has been captured while the camera 10 remains tilted. In this case, a resultant captured image 32 has an image of the subject tilted with reference to a rectangular image capture area 34 as illustrated in FIG. 2A. In the following drawings, arrow G depicts the direction of gravity in the environment of the subject. In many cases, the composition desired by the user is a composition where the image of the subject stands in an erect position in the image capture area 34. Therefore, as shown in FIG. 2A, the image where the image of the subject is tilted with reference to the image capture area 34 can be assumed to differ from the composition intended by the user.

During composition correction processing, when the camera is determined to be tilted during image capture operation, the captured image 32 is subjected to rotation processing in such a way that the image of the subject stands in an erect position, in accordance with the attitude angle of the camera. However, mere rotation processing results in creation of missing portions involving no images in a rectangular image area for recording 38. Specifically, as shown in FIG. 2B, missing portions 40 involving no images arise at the corners of the image area for recording 38. In view of such missing portions 40, an image of the composition desired by the user cannot be said to have been captured.

Figure 3:
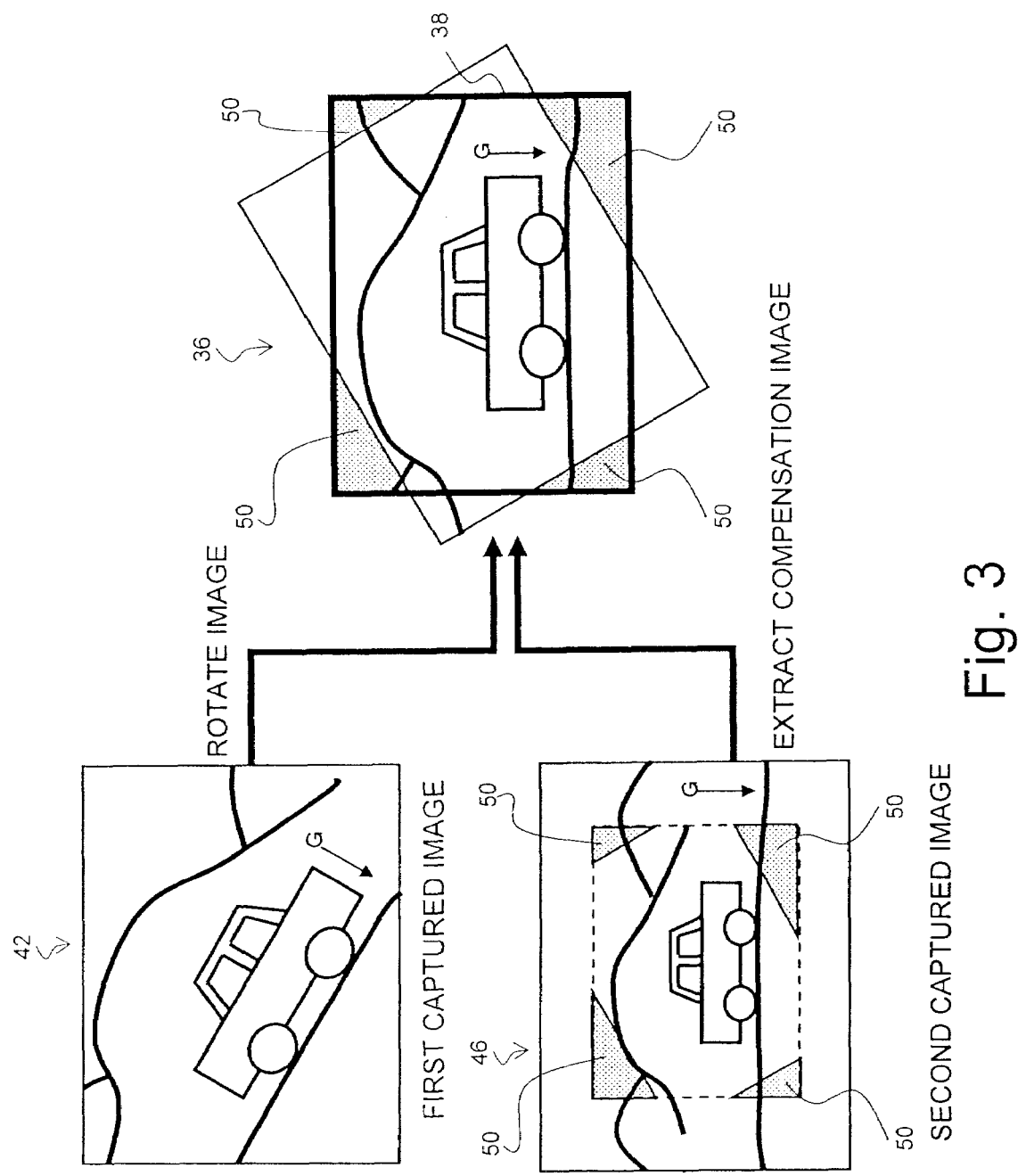
FIG. 3 is a view showing a concept of composition correction processing.

In the present embodiment, compensation processing for compensating for these missing portions 40 is also performed. FIG. 3 is a view for describing composition correction processing including rotation processing and compensation processing. During compensation processing, aside from the image 42 captured through image capture operation with the camera being tilted (hereinafter called a "first captured image"), an image 46 obtained by newly capturing the image of the same subject (hereinafter called a "second captured image") is utilized.

The second captured image 46 is wider than the first captured image 42 in terms of the angle of view. Further, when the second captured image 46 is acquired, rigorous adjustment of the attitude angle of the camera is desired in order to achieve the full image of the subject. Put another way, the second captured image 46 is desirably an image where the image of the subject stands in an erect position. Such a second captured image 46 includes images of the subject corresponding to the missing portions induced as a result of rotational processing of the first captured image 42.

The control unit 18 of the camera extracts the images of the subject corresponding to the missing portions from the second captured image 46 as compensation images 50. Extraction of the compensation images 50 is performed on the premise that the center of the first captured image 42 coincides with the center of the second captured image 46. The extracted compensation images 50 are enlarged in accordance with the angle of view used for capturing the first captured image 42. The enlarged compensation images 50 are synthesized with the rotated first captured image 42, to thus create a corrected image 36. Consequently, the finally-obtained corrected image 36 becomes a preferable image where the image of the subject stands in an erect position and the four corners of the image area for recording 38 have images. The user usually pays strong attention to the center of the image area for recording 38, and requires high definition in the center. In the present embodiment, the center receiving the user's strong attention is not at all subjected to enlarging processing, and the image quality of the center is sufficiently maintained. Meanwhile, the four corners of the image area for recording 38 are compensated for by the images obtained by enlarging portions of the second captured image 46, which is the wide angle image. Therefore, the image quality of the four corners can be said to be deteriorated to some extent. However, in normal times, the user pays less attention to the corners of the image area for recording 38. Even when the image quality of the corners is degraded to a certain extent, the level of user satisfaction is hardly affected. Namely, according to the present embodiment, a corrected image of appropriate composition can be obtained while a high level of user satisfaction is maintained.

Figure 14:
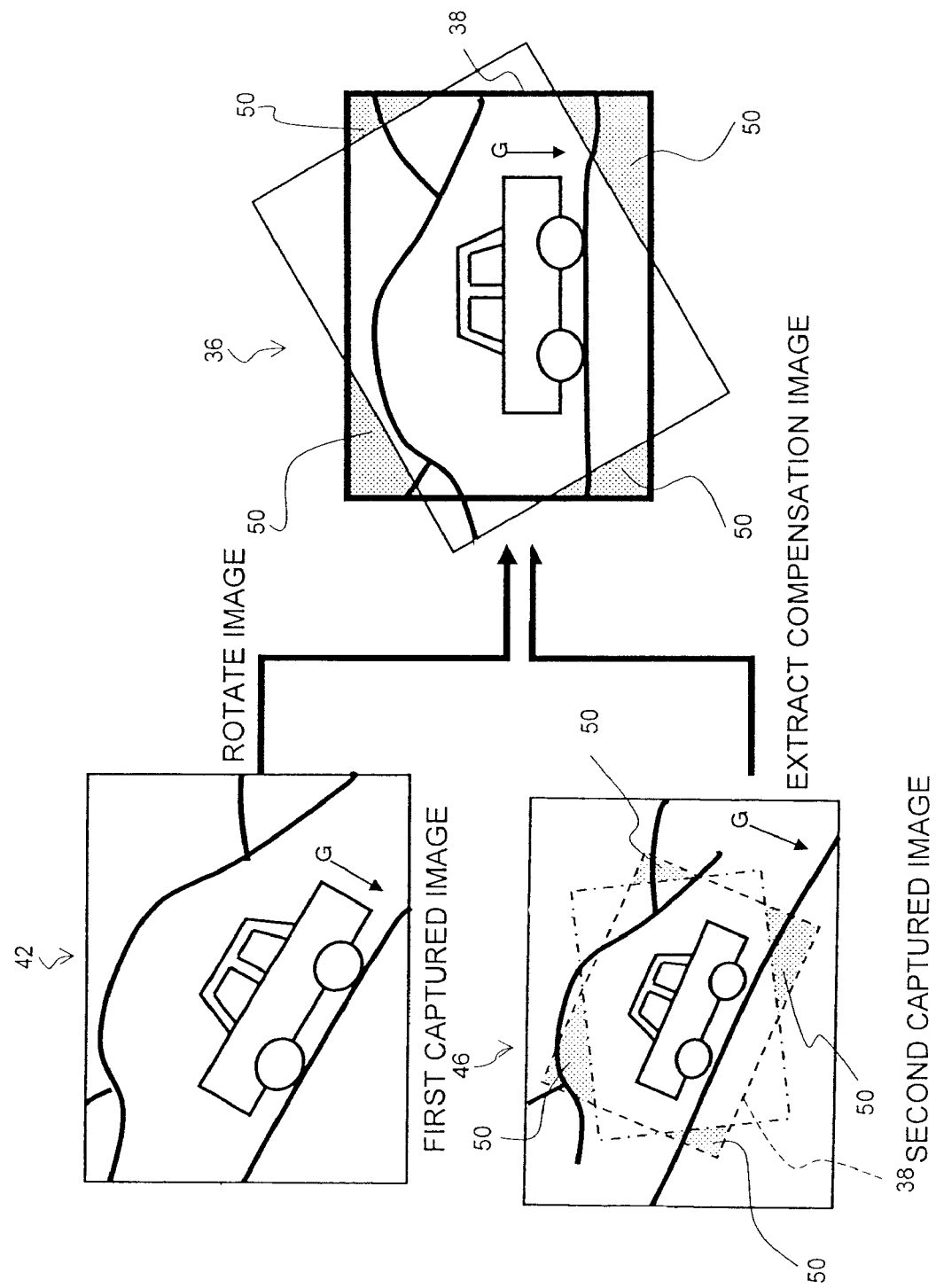
FIG. 14 is a view showing another concept of composition correction processing.

In the descriptions, the second captured image 46 is taken as an image where the image of the subject stands in an erect position. However, so long as the image includes missing portions, the image does not need to be an erect image. As shown in FIG. 14, when the second captured image 46 is sufficiently wider than the first captured image 42 in terms of angle of view, the second captured image 46 includes images corresponding to the missing portions of the first captured image 42 even when the subject of the second captured image 46 is tilted. In this case, the control unit 18 of the camera extracts the images of the subject corresponding to the missing portions from the second captured image 46 as the compensation images 50 in accordance with the angle of view and the attitude angle at which the first and second captured images 42 and 46 are captured. As a result of the extracted compensation images 50 being synthesized with the first rotated captured image 42, the preferred corrected image 36 where the image of the subject stands in an erect position is obtained.

The above descriptions are based on the premise that the center of the first captured image 42 coincides with the center of the second captured image 46. However, so long as the second captured image 46 is sufficiently wider than the first captured image 42 in terms of angle of view, there may exist a slight deviation exist between the center of the captured images. Specifically, provided that the second captured image 46 is sufficiently wider than the first captured image 42 in terms of angle of view, even when a slight deviation exists in the centers of the captured images, the second captured image 46 includes images corresponding to the missing portions of the first captured image. Consequently, the compensation images 50 can be extracted from the second captured image 46, and the preferred corrected image 36 where the image of the subject stands in an erect position can be obtained. In this case, however, the amount of deviation between the center of the first captured image 42 and the center of the second captured image 46 is desirably detected by use of a sensor such as a gyroscope, or the like.

Figure 4:
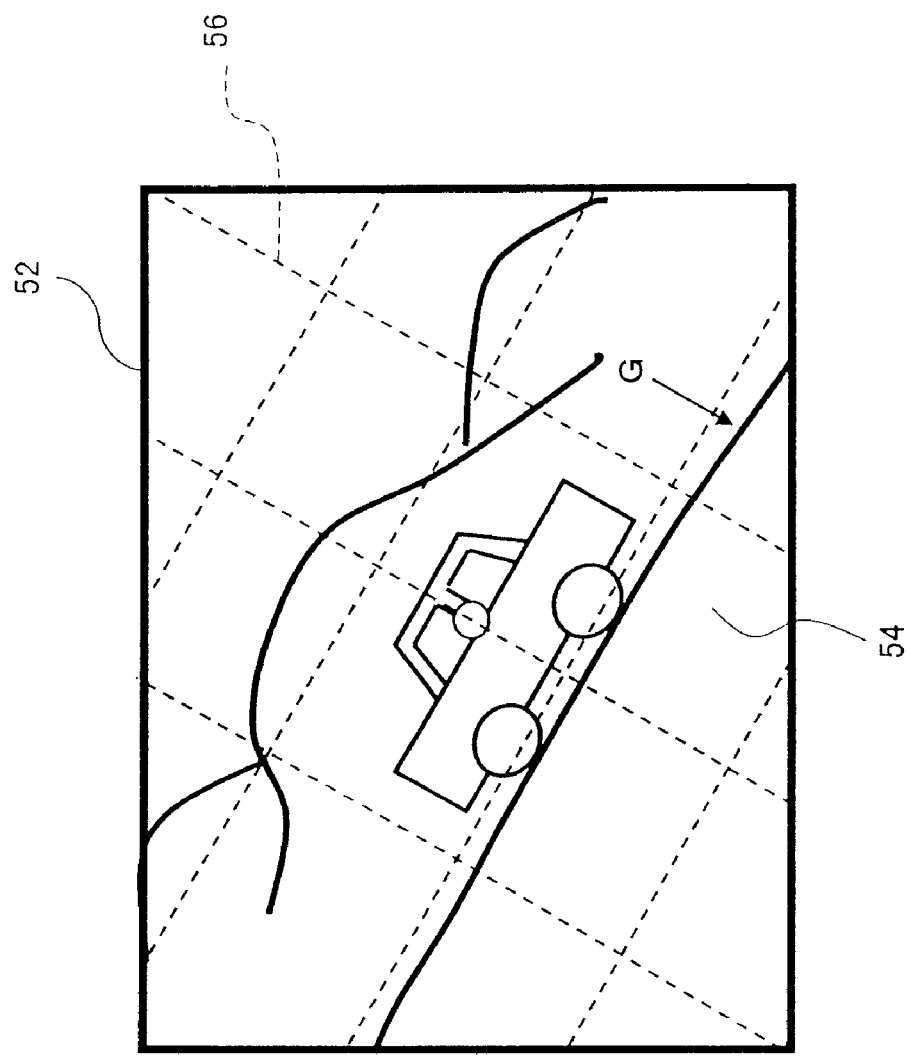
FIG. 4 is a view showing an example display of grid lines.

If the second captured image 46 includes the missing portions, the second captured image 46 may have the same angle of view as that of the first captured image 42. Specifically, so long as rigorous coincidence exists between the center of the second captured image 46 and the center of the first captured image 42 and if the image of the subject in the second captured image 46 stands in a rigorous erect position, the second captured image includes the missing portions, even when the first captured image 42 and the second captured image 46 have the same angle of view. In this case, difficulty is encountered in rigorously adjusting the attitude angle of the camera achieved by means of only user's perception during image capture operation. It is desirable for the camera to provide an auxiliary function of some type to the user during capture of the second captured image 46. For instance, when the attitude of the camera can be determined to be appropriate on the basis of the result of detection performed by the attitude sensor 30, a conceivable auxiliary function is to prompt the user to perform image capture operation, by means of outputting an alarm. Another conceivable auxiliary function is to display a grid on the LCD 20 that is an electronic finder. Although various display patterns of the grid are conceivable, a conceivable display of the grid lines is to change the angle of the grid lines, as appropriate, according to the detection result output from the attitude sensor 30. FIG. 4 shows the display of the grid lines achieved in this case. In FIG. 4, broken lines correspond to grid lines 56 appearing on the LCD 20. The grid lines 56 are formed from lines parallel to and orthogonal to the direction of gravity as detected by the attitude sensor 30. The only action required of the user is to perform image capture operation for capturing the second captured image 46 by means of adjusting the attitude of the camera in such a way that the grid lines 56 become parallel to or orthogonal to a frame line 52 of the LCD 20.

Figure 5B:
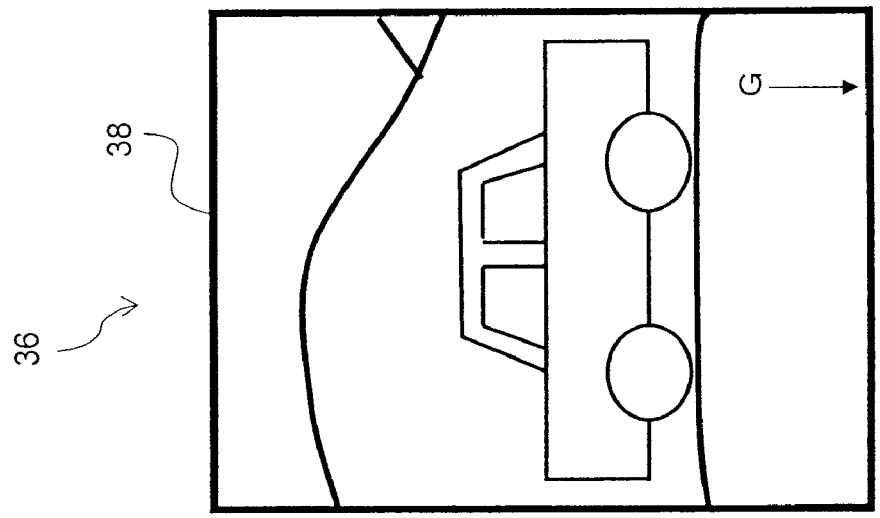
FIG. 5 is a view showing one mode of composition correction processing.
Figure 5A:
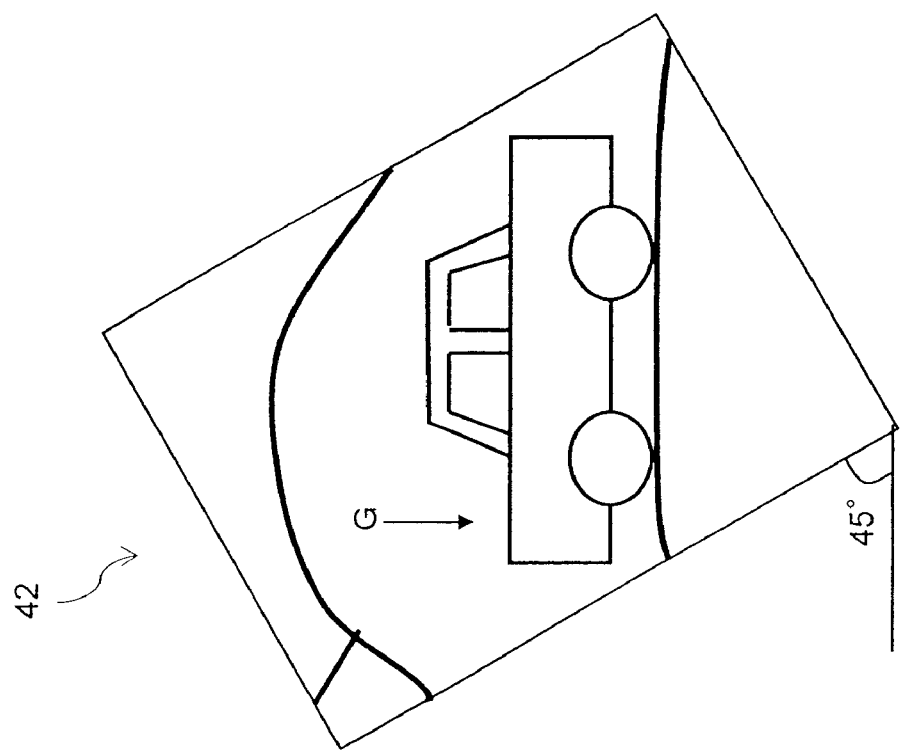

In the above descriptions, the image area for recording 38 is assumed to have a landscape rectangular shape. Depending on the attitude angle of the camera, composition correction processing may be performed while the image area for recording 38 is taken as a portrait rectangular area. As shown in FIGS. 5A and 5B, when the attitude angle of the camera is 45 degrees or more, it is better to perform processing while taking the image area for recording 38 as a portrait rectangular shape, because the areas of the missing portions become smaller. Accordingly, when the attitude angle of the camera is 45 degrees or more, composition correction processing is performed while the image area for recording 38 is taken as a portrait rectangular shape.

Figure 6:
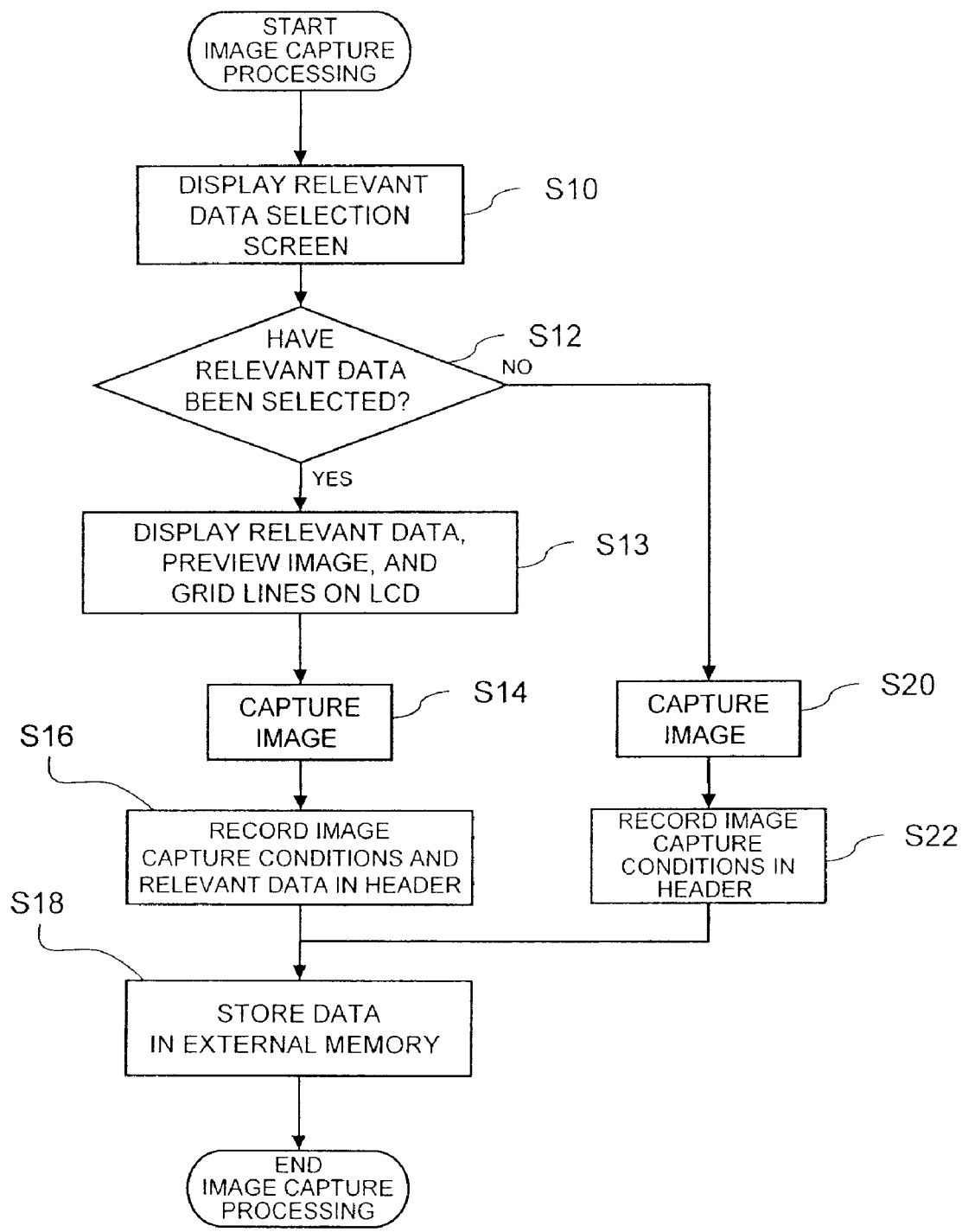
FIG. 6 is a flowchart showing the flow of image capture processing.

Next will be described the flow of image capture processing performed by this camera. FIG. 6 is a flowchart showing the flow of image capture processing. When image capture is performed, the control unit 18 of the camera first displays, on the LCD 20, a relevant data selection image used for specifying relevant data (S10). The relevant data correspond to the first captured image data in the descriptions. The first captured image data, which require composition correction processing, are present in the captured or recorded image data. When an image which is to be captured from now on is utilized as a second captured image for composition correction processing, the image data corresponding to the first captured image become relevant data.

When relevant data; i.e., the first captured image data, are not present, the user sends a report to this effect to the camera by way of a user control. In this case, the camera performs normal image capture processing (S20, S22, and S18). Specifically, image capture processing is performed at a timing when the user has depressed a release button (S20), and image capture conditions, such as the angle of view used for image capture operation and the like, are recorded in a header portion of obtained image data (S22). The image data are recorded in external memory (S18).

Figure 7:
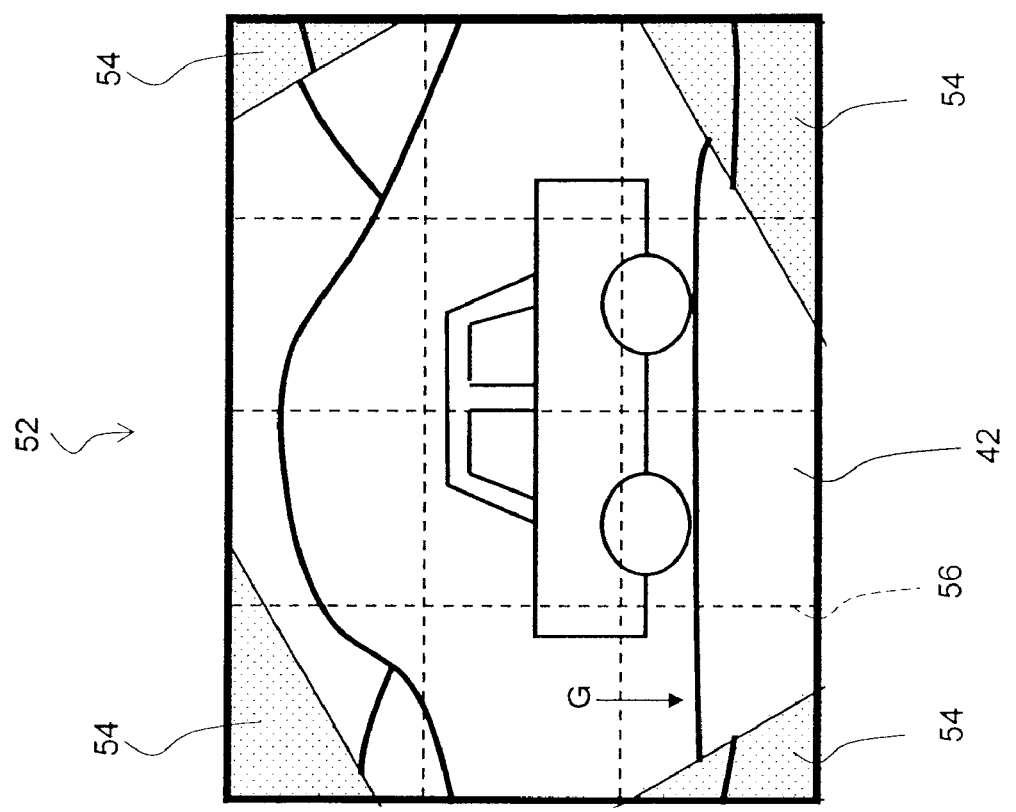
FIG. 7 is a view showing an example preview screen display.

Meanwhile, when the user has selectively specified relevant data (first captured image data)(S12), the camera displays on the LCD 20 the specified first captured image, the preview image, and the grid lines (S13). FIG. 7 shows an example display screen appearing at this time. A rotated first captured image 42; that is, the first captured image 42 where the image of the subject stands in an erect position, is displayed on the display screen. At this time, the center of the first captured image 42 is caused to coincide with the center of the display screen. The first captured image 42 is displayed while being appropriately scaled-up or scaled-down in accordance with the angle of view for image capture (hereinafter called an "image capturing angle of view") selected at this point in time. When the image capturing angle of view employed at this point in time is wider than the image capturing angle of view employed during capture of the first captured image 42, the first captured image 42 is displayed in a scaled-down manner. Conversely, when the image capturing angle of view achieved at this point in time is narrower than the image capturing angle of view employed during capture of the first captured image 42, the first captured image 42 is displayed in a scaled-up manner. Capturing the second captured image at an angle narrower than the image capturing angle of view employed during capture of the first captured image 42 is not desirable. Hence, when a narrower angle has been selected, outputting an alarm of some type or prohibiting capture of the second captured image is desirable.

When the rotated first captured image 42 is displayed, missing portions—where no images are present—arise at the corners of the image. A preview image 54, which is to be captured from now on, is displayed in the missing portions. The user determines the composition of the second captured image while viewing alignment between the preview image 54 and the rotated first captured image 42 or the grid lines 56, and performs image capture operation (S14).

If the second captured image is obtained through image capture operation, the control unit 18 records the name of relevant data (the name of the first captured image data), the attitude angle of the camera employed during image capture operation, the image capturing angle of view, and the like, in a header portion of the image data (S16); and stores them in the external memory (S18).

Figure 8:
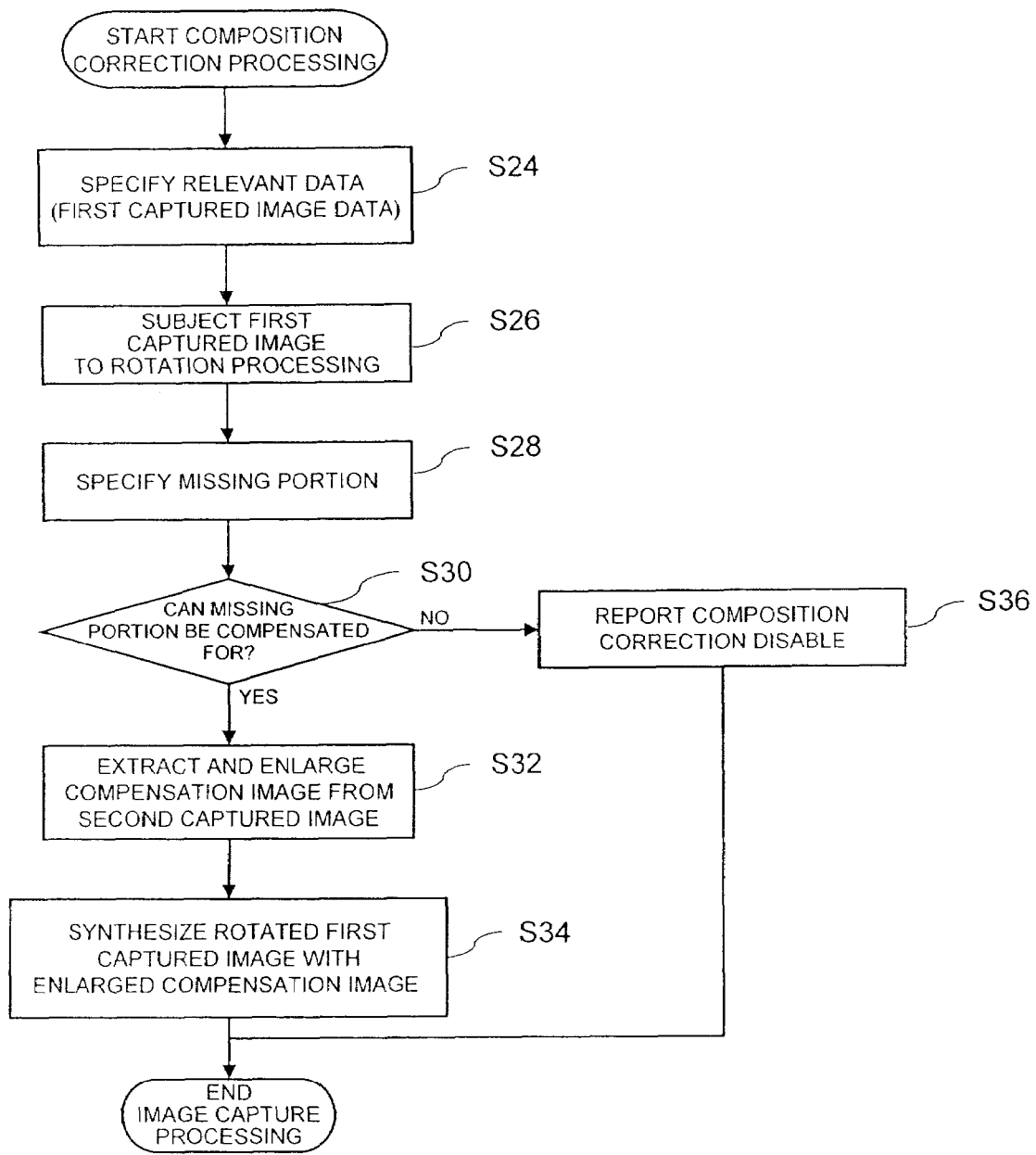
FIG. 8 is a flowchart showing the flow of composition correction processing.

Flow of composition correction processing will now be described. FIG. 8 is a flowchart showing the flow of composition correction processing. Composition correction processing is automatically initiated upon completion of capture of the second captured image or is commenced upon receipt of an instruction of some type from the user.

Through composition correction processing, the first captured image (relevant data) recorded in the header of the second captured image is first specified (S24). In accordance with the attitude angle of the camera recorded in the header of the first captured image data, the first captured image is subjected to rotation processing such that an image of the subject is caused to stand in an erect position (S26). Subsequently, a determination is made as to whether or not missing portions arising as a result of rotation processing of the first captured image can be compensated for by the second captured image (S28, S30). On the premise that the center of the first captured image and the center of the second captured image coincide with each other, a determination is made as to whether or not images of the subject corresponding to the missing portions are included in the second captured image, in accordance with the image-capture angles of view employed for capturing the first and second captured images and the attitudes of the camera used for capturing the first and second captured images.

When the result of the determination shows that the images of the subject corresponding to the missing portions are not included in the second captured image, a message stating that composition correction processing cannot be performed is provided to the user, and processing is completed (S36). Meanwhile, when the images of the subject corresponding to the missing portions are included in the second captured image, the images of the subject corresponding to the missing portions are extracted as compensation images, and the compensation images are enlarged in accordance with the image-capture angle of view used for capturing the first captured image (S32). The enlarged compensation image and the rotated first captured image are synthesized with each other. When a corrected image is obtained, composition correction processing is completed (S34).

As is obvious from the above descriptions, according to the present embodiment, the composition of the captured image can be corrected without involvement of deterioration of the image quality of the center of the image or occurrence of missing portions at the corners of the image. Consequently, an image providing a high level of user satisfaction can be obtained.

The above embodiment has illustrated the case where the second captured image is captured in accordance with the instruction from the user. However, the second captured image may be captured automatically. For instance, after having captured the first captured image, the camera may determine whether or not the composition of the first captured image is appropriate, on the basis of the attitude of the camera employed during image capture operation. When the composition of the camera is determined to be inappropriate, capturing of the second captured image may be performed automatically.

In the present embodiment, specification of relevant data (the first captured image data) is carried out by means of user's selection. However, specification of relevant data may be performed automatically. Specifically, when the user has captured an image, the composition of the captured image may be determined on the basis of a detection result output from the attitude sensor during image capture operation. When the composition has been determined to be inappropriate (the image of the subject is determined to be tilted), a message to this effect is provided to the user to thus ask whether or not the second captured image is to be captured. When the user has instructed the camera to capture the second captured image, the camera may automatically specify the image captured immediately before receipt of the instruction as a second captured image.

Figure 9:
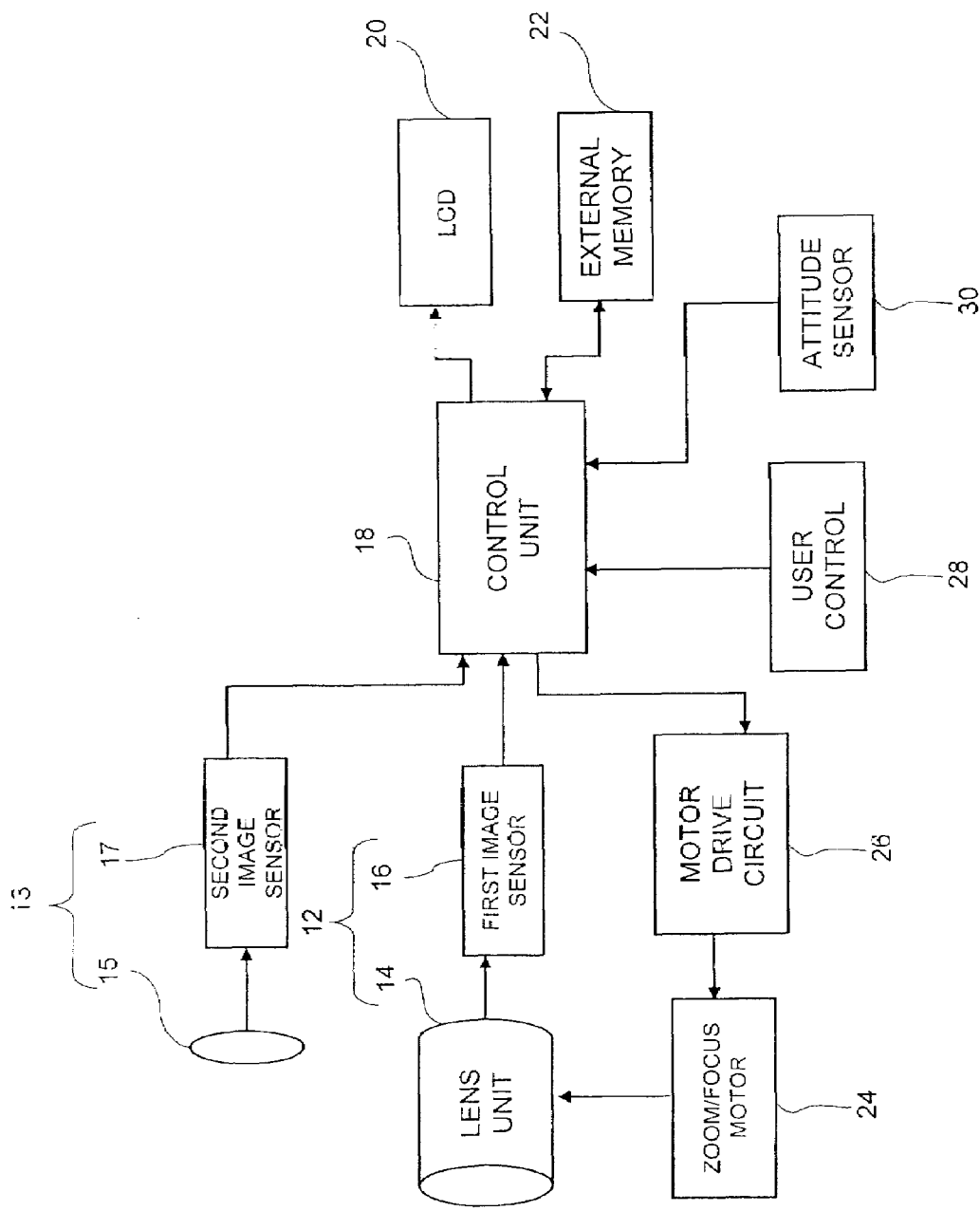
FIG. 9 is a block diagram showing the general configuration of a digital camera according to a second embodiment of the present invention.

A second embodiment of the present invention will now be described. FIG. 9 is a block diagram showing the general configuration of the digital camera 10 of the second embodiment. The digital camera 10 differs greatly from that of the first embodiment in that the digital camera has two mutually-independent image capture units 12, 13. Specifically, the digital camera 10 of the embodiment comprises a first image capture unit 12 formed from a lens unit 14 and a first image sensor 16; and a second image capture unit 13 formed from a monofocal lens unit 15 and a second image sensor 17. The first image capture unit 12 is identical in structure with the image capture unit of the first embodiment. The monofocal lens unit 15 in the second image capture unit 13 can utilize, e.g., a super-wide angle lens (the 35 mm camera equivalent focal length is 22 mm) or the like. The second image sensor 17 is a color megapixel CCD sensor which has the 4:3 aspect ratio, as in the case of the first image sensor 16. The first image capture unit 12 and the second image capture unit 13 can perform image capture operation independently of each other, to thus be able to simultaneously capture a single subject at different angles of view. In other respects, the second embodiment is identical in structure with the first embodiment, and hence detailed explanations are omitted.

In the present embodiment, two images simultaneously captured by the two image capture units 12, 13 are taken as the first and second captured images, and are subjected to composition correction processing. Specifically, the telephotographic image captured by the first image capture unit 12 is taken as the first captured image, and the wide angle image captured by the second image capture unit 13 is taken as the second captured image. At this time, the two image capture units 12, 13 are provided on the single camera. Therefore, the images of the subject in the two images simultaneously captured by the image capture units 12, 13 become equal to each other in terms of an attitude. The centers of the subjects of the two captured images coincide with each other at all times. Therefore, if a sufficient difference exists between the angle of view employed for the telephotographic image (the first captured image) and the angle of view employed for the wide angle view (the second captured image), the wide angle image inevitably includes images of the subject corresponding to the missing portions that arise when the telephotographic image undergoes rotation processing.

Figure 10:
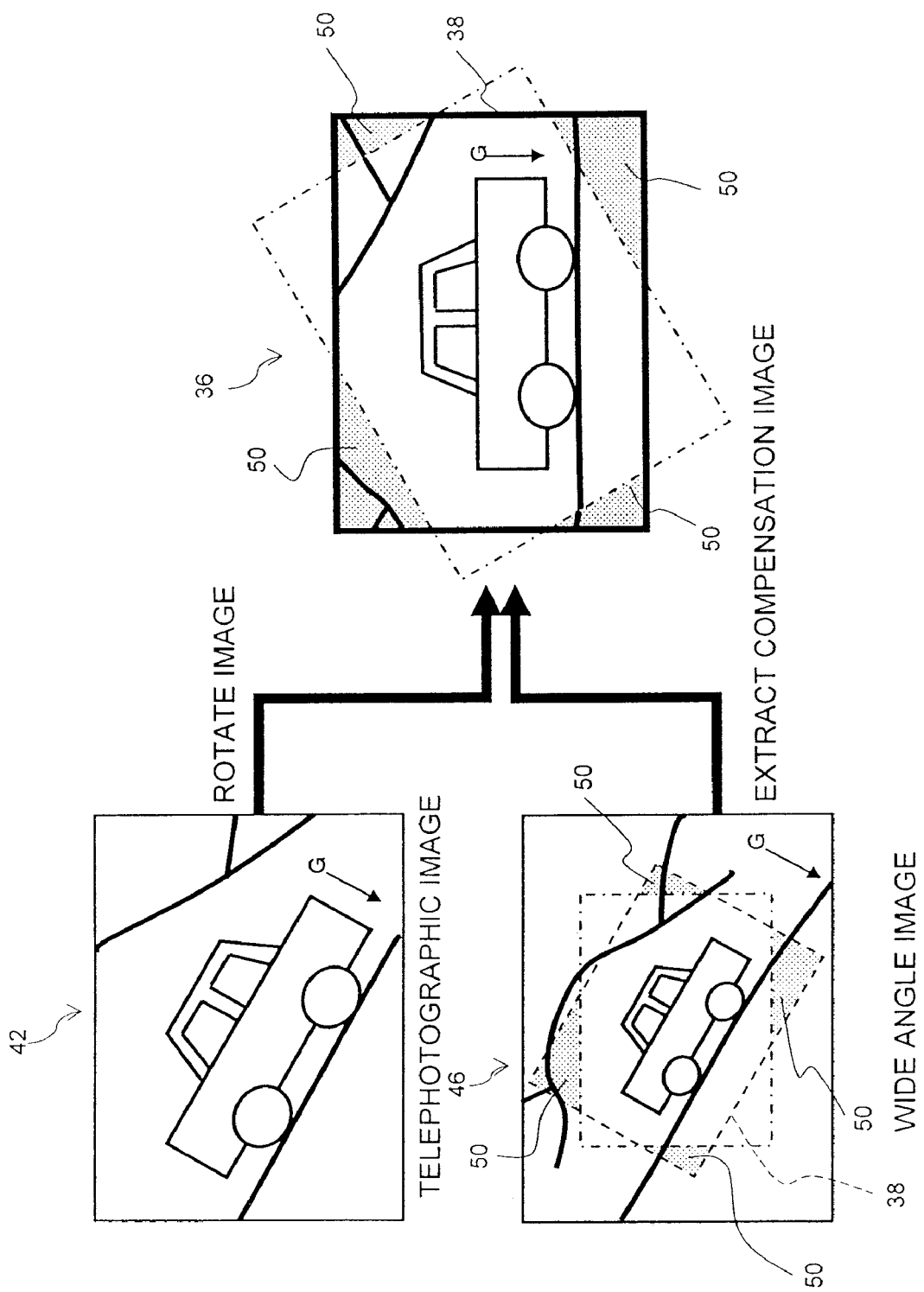
FIG. 10 is a view showing another mode of composition correction processing.

FIG. 10 is a view showing another concept of composition correction processing of the present embodiment. When the two image capture units 12, 13 have simultaneously performed image capture operation while the camera is tilted, the resultant two captured images 42, 46 become images where the image of the subject is tilted. When the composition of the telephotographic image 42 is corrected, the telephotographic image 42 is first rotated in accordance with the attitude angle of the camera. When a sufficient difference exists between the angle of view employed for the wide angle image 46 and the angle of view employed for the telephotographic image 42, the wide angle image 46 includes images of the subject corresponding to missing portions which arise at the corners of the image area for recording 38 due to rotation of the telephotographic image 42. Consequently, images of the subject corresponding to the missing portions can be extracted from the wide angle image 46 as the compensation images 50. After the extracted compensation images 50 have been enlarged in accordance with the image capturing angle of view employed for the telephotographic image 42, the compensation images are synthesized with the rotated telephotographic image 42, whereby the appropriate corrected image 36 where the image of the subject stands in an erect position can be obtained.

Figure 11:
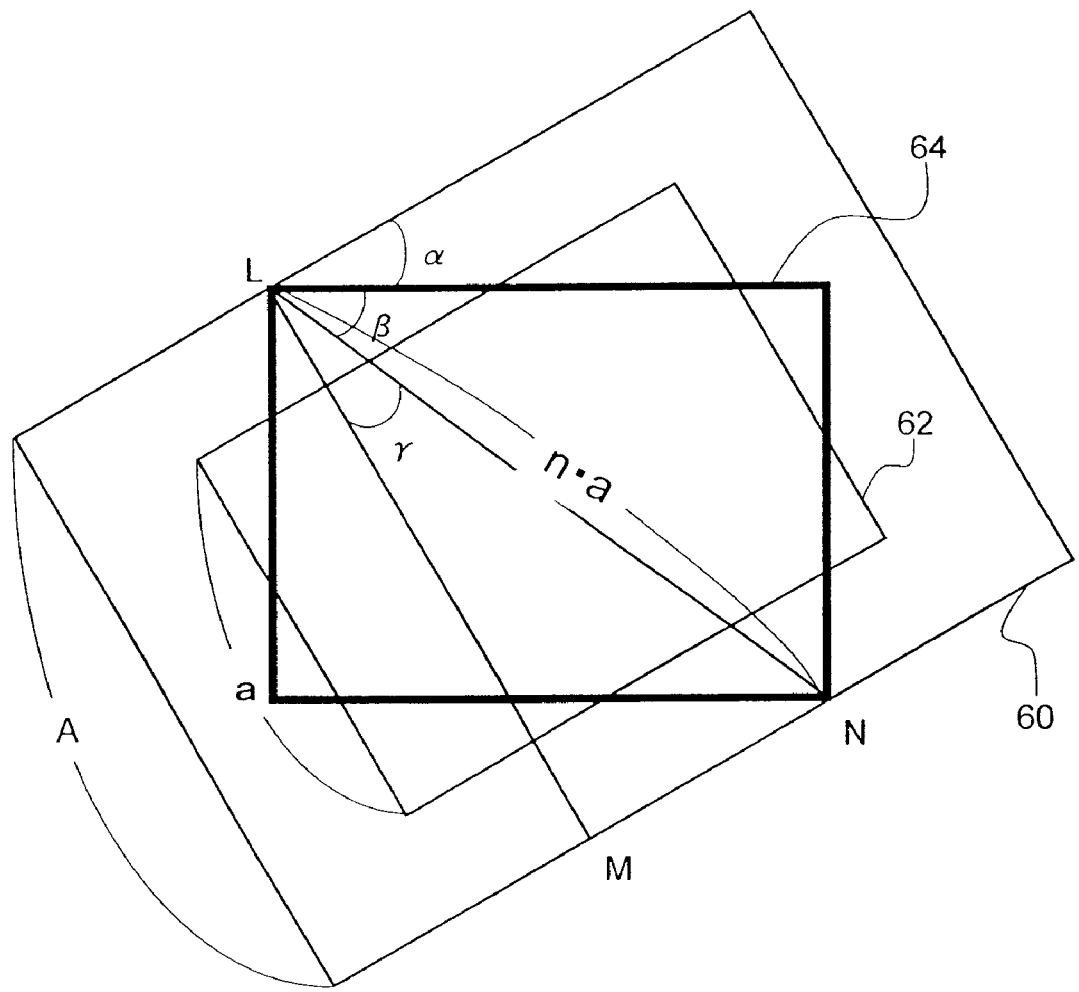
FIG. 11 is a view showing a relationship between subject ranges of respective images.

The difference between the angle of view employed for the telephotographic image 42 and the angle of view employed for the wide angle view 46, which is required for effecting appropriate composition correction processing, is determined by the attitude angle of the camera. This will be described by reference to FIG. 11. In FIG. 11, a rectangular shape 60 represents the range of a subject included in a wide angle image, and a rectangular shape 62 represents the range of a subject included in a telephotographic image. A rectangular shape 64 represents the range of a subject included in a corrected image formed by means of subjecting a telephotographic image to composition correction processing. As shown in FIG. 11, in order to perform appropriate composition correction processing, the wide angle view must fully encompass a subject range 64 in the corrected image. The length of the short side of the subject range 60 in the wide angle image is taken as A, and the length of a short side of the subject range 62 in the telephotographic image is taken as "a." A relationship between A and "a" will now be described.

The length of a diagonal line LN of the subject range 64 in the corrected image can be represented as $LN=n\cdot a$, where "n" denotes a value determined by the aspect ratio of the subject range 64. When the aspect ratio is 4:3, "n" assumes a value of 5. An angle $\beta$ made between the diagonal line LN and the long side of the subject range 64 is a fixed value determined by the aspect ratio of the subject range 64.

When the attitude angle of the camera is taken as $\alpha$, an angle $\gamma$ made between the diagonal line LN and a normal LM extending from one end of the diagonal line LN to the long side of the subject range 60 of the wide angle image is defined as $\gamma=90-(\alpha+\beta)$. The normal LM is determined as $LM=n\cdot a\cdot\cos(\gamma)=n\cdot a\cdot\cos(90-\alpha-\beta)=n\cdot a\cdot\sin(\alpha+\beta)$. Since the normal LM is equal in length to the short side of the subject range 60 of the wide angle image, we have $A=n\cdot a\cdot\sin(\alpha+\beta)$. When reference symbol A represents a length satisfying the equation, appropriate composition correction processing becomes feasible.

In short, when the subject range 60 of the wide angle image is $n\cdot\sin(\alpha+\beta)$ times as large as the subject range 62 of the telephotographic image, appropriate composition correction processing can be performed. Consequently, a difference in angle of view required for performing appropriate composition correction processing can be said to be a difference in angle of view at which the subject range becomes $n\cdot\sin(\alpha+\beta)$ times or more.

Figure 12:
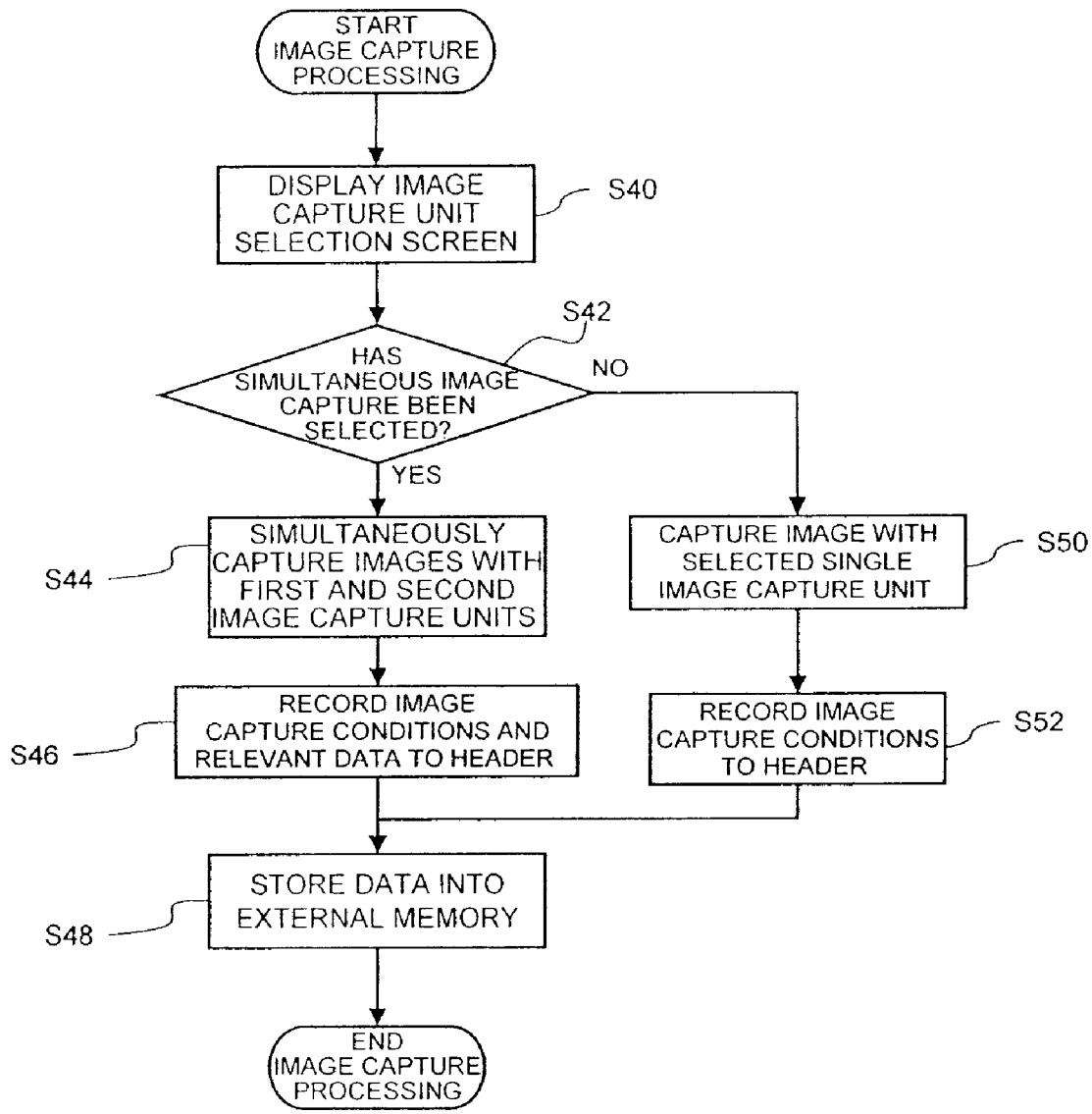
FIG. 12 is a flowchart showing the flow of image capture processing.

Flow of respective processing operations in the present embodiment will now be described. FIG. 12 is a view showing the flow of image capture processing of the second embodiment. This digital camera can select any one from image capture operation performed solely by the first image capture unit 12, image capture operation performed solely by the second image capture unit 13, and simultaneous image capture operations performed by the first and second image capture units 12, 13. When image capture processing is performed, the camera first displays a screen for selecting an image capture unit used for capturing an image, and prompts the user to perform selection (S40). The user operates a control panel and the like, to thus select an image capture unit used for image capture operation.

When image capture operation performed by a single image capture unit has been selected, ordinary image capture operation is performed by means of the selected image capture unit (S50). Image capture conditions, such as an image-capture angle, and the like, are recorded in the header of the captured image data (S52), and the thus-recorded image capture conditions are recorded in external memory (S48).

Meanwhile, when simultaneous image capture operation performed by the two image capture units has been selected (S42), the first and second image capture units perform simultaneous image capture operation (S44). The attitude angle of the camera acquired during image capture operation and the angle of view acquired during image capture operation are recorded in respective headers of the obtained two frames of image capture data. The file name of the other one of the simultaneously-captured frames of image data is also stored in the header (S46). Namely, the file name of the wide angle image is stored as the name of a relevant data file in the header of the telephotographic image, and the file name of the telephotographic image is stored as the name of a relevant data file in the header of the wide angle image. After these pieces of information have been written into the headers, the images are stored in memory (S48). When storage of the images into the memory has been completed, image-capture processing ends.

Figure 13:
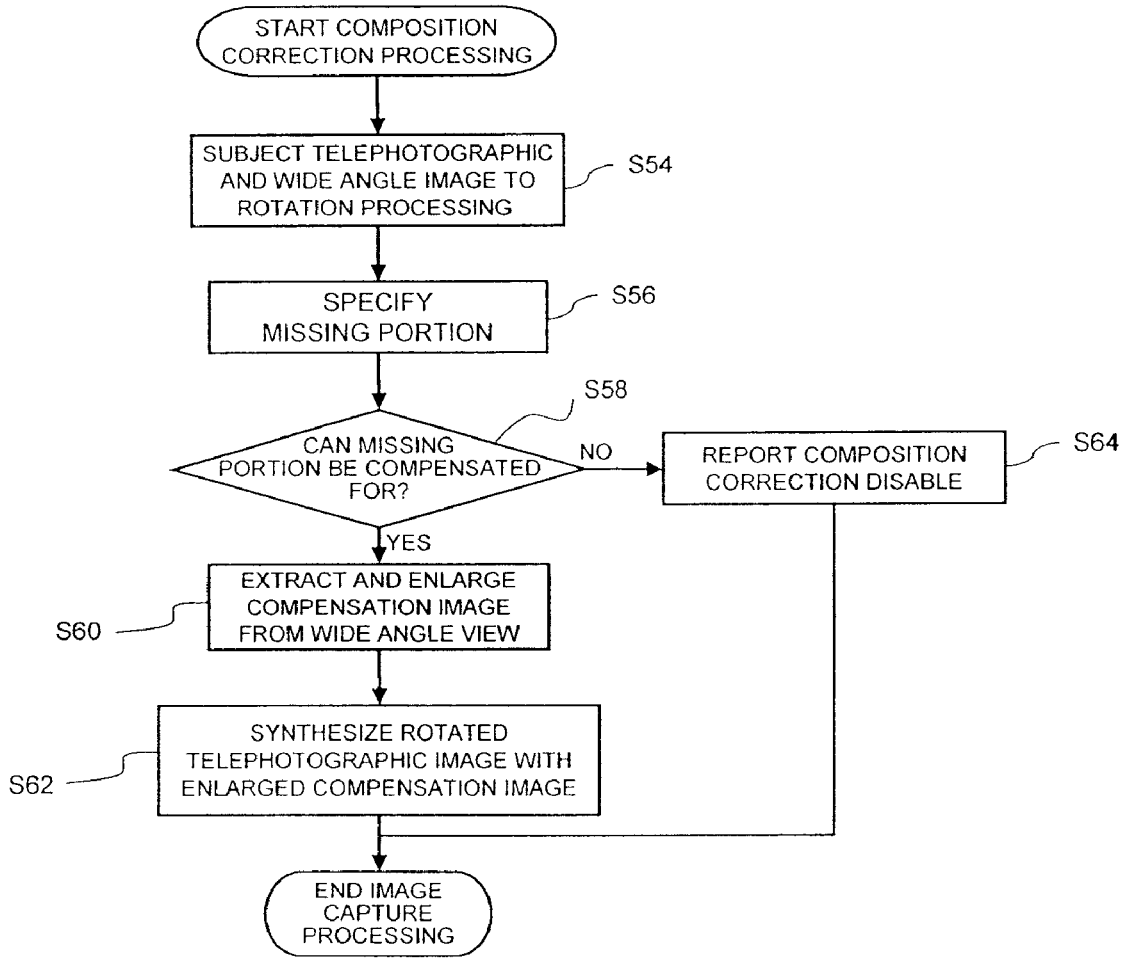
FIG. 13 is a flowchart showing the flow of composition correction processing.

The flow of composition correction processing will now be described by reference to FIG. 13. The composition correction processing is automatically started on the basis of the attitude angle of the camera employed during image capture operation or is initiated in response to an instruction from the user. An object of composition correction processing is the telephotographic image, and the wide angle image is used as a second captured image for use in compensating for missing portions of the telephotographic image.

When composition correction is performed, both a telephotographic image and a wide angle image are first subjected to rotation processing (S54). Specifically, the attitude angles of the camera stored in the respective headers of both image files are read, and the images are rotated, in accordance with the attitude angle, in such a way that the image of the subject stands in an erect position.

The images are then compared with each other, to thus determine whether or not the missing portions having arisen in the telephotographic image as a result of rotation can be compensated for, on the basis of the wide angle image (S56, S58). On the basis of the rotated telephotographic image, the missing portions are specified (S56). Subsequently, on the basis of a difference between the angle of view of the wide angle image and the angle of view of the telephotographic image, a determination is made as to whether or not images of the subject corresponding to the missing portions are included in the wide angle image (S58). When the images of the subject corresponding to the missing portions are not included, a message to this effect is provided to the user, and composition correction processing is completed (S64).

When images of the subject corresponding to the missing portions are included in the wide angle image, the images of the subject are extracted as compensation images from the telephotographic image, and the compensation images are enlarged in accordance with the angle of view of the telephotographic image (S60). As a result of the enlarged compensation images being synthesized with the rotated telephotographic image, the image of the subject stands in an erect position, and a correction image having no missing portions is obtained (S62).

As is evident from the above descriptions, according to the present embodiment, there can be obtained a corrected image of preferable composition where the image of the subject stands in an erect position, without involvement of deterioration of image quality of an area of interest in the image or occurrence of missing portions at corners of the image, as in the case of the first embodiment. In the present embodiment, there are provided two image capture units capable of simultaneously capturing the image of a single subject at different angles of view. Therefore, there is no necessity for concern about adjustment of the center of a captured image. Consequently, simpler, preferable composition correction processing becomes feasible.

The first and second embodiments have described the case where composition correction processing is performed within the digital camera. As a matter of course, composition correction processing may be performed in another information processor; e.g., a personal computer.

PARTS LIST 10 digital camera
12 image capture unit
13 image capture unit
14 lens unit
15 lens unit
16 image sensor
17 image sensor
18 control unit
20 LCD
22 external memory
24 zoom/focus motor
26 motor drive circuit
28 user control
30 attitude sensor
32 captured image
34 image capture area
36 corrected image
38 rectangular image area for recording
40 missing portions
42 first captured image
46 second captured image
50 compensation images
52 frame line
54 preview image
56 grid lines
60 subject range
62 subject range
64 subject range
S10 display relevant data selection screen
S12 has relevant data been selected
S13 display preview image and grid line
S14 capture image
S16 record image capture conditions and relevant data in header
S18 record image data in external memory
S20 capture image
S22 record image capture conditions in header
S24 specify relevant data
S26 captured image subjected to rotation processing
S28 specify missing portion
S30 can missing portion be compensated for
S32 extract and enlarge compensation image from second captured image
S34 obtain corrected image, composition correction process complete
S36 composition correction processing disabled
S40 display image capture unit selection screen
S42 has simultaneous image capture been selected
S44 simultaneous capture image with first and second image capture units
S46 record image capture conditions and relevant data to header
S48 store data in external memory
S50 capture image with selected single image capture unit
S52 record image capture conditions to header
S54 telephotographic and wide angle images subjected to rotation processing
S56 specify missing portion
S58 can missing portion be compensated for
S60 compensation images are enlarged and extracted
S62 synthesized rotated telephotographic image with enlarged compensated image
S64 report composition correction disable

The invention claimed is:

1. A digital camera comprising:
first captured image obtaining means for acquiring a first captured image by capturing an image of a subject at predetermined angle of view;
second captured image obtaining means for acquiring a second captured image by means of capturing an image of a subject identical with the subject while at least one of the image capturing angle of view and an attitude of the camera is changed as compared with its counterpart used for capturing the first captured image;
attitude detection means for detecting the attitude of the camera during image-capture operation;
rotation processing means for rotating the first captured image in order to make an image of the subject in the first captured image stand in an erect position, on the basis of the attitude detected at the time of capture of the first captured image; and
compensation means for compensating for missing portions where portions of the image are absent in a predetermined image recording range due to rotation of the first captured image, on the basis of the second captured image wherein the first captured image obtaining means and the second captured image obtaining means are two image capture means which are independently provided in one camera and capable of simultaneously acquiring images of a single subject at different angles of view; and the first captured image and the second captured image we images which are simultaneously captured by the two image capture means.

2. The digital camera according to claim 1, wherein the second captured image obtaining means captures an image at an angle of view which is wider than that used for capturing the first captured image, to thus acquire the second captured image.

3. The digital camera according to claim 2, wherein the compensation means extracts the images of the subject corresponding to the missing portions from the second captured image as compensation images, and compensates for the missing portion with images which is formed by enlarging the compensation images in accordance with the image capturing angle of view employed for capturing the first captured image.

4. The digital camera according to claim 2, further comprising first captured image display means for displaying, along with a preview screen, a first captured image that has been rotated by the rotation processing means in such a way that the image of the subject stands in an erect position.

5. The digital camera according to claim 1, wherein the second captured image obtaining means performs image capture operation with the attitude of the camera by means of which the image of the subject stands in an erect position, to thus acquire the second captured image.

6. The digital camera according to claim 5, further comprising grid line display means for displaying grid lines, whose attitude angle changes according to a detection result output from the attitude detection means, in conjunction with a preview screen.

7. The digital camera according to claim 1, where the first captured image obtaining means and the second captured image obtaining means are identical image capture means, and the first captured image and the second captured image are images which have been captured with a time difference.

8. The digital camera according to claim 1, wherein the shape of an image area for recording is switched between a landscape rectangular shape and a portrait rectangular shape, on the basis of the attitude of the camera employed at the time of capture of the first captured image.

9. A composition correction apparatus comprising:
rotation processing means for rotating a first captured image obtained by a first captured image means of capturing an image of a subject at a predetermined angle of view, on the basis of the attitude detected during capture of the first captured image in order to cause the image of the subject to sand in an erect position;
compensation means for compensating for missing portions, where images are absent in predetermined image recording areas due to rotation of the first captured image, on the basis of a second captured image obtained by capturing an image of a subject identical with that of the first captured image while at least one of an image capturing angle of view and an attitude of the camera is changed as compared with its counterpart employed for capturing the first captured image;
second captured image obtaining means for acquiring a second captured image by means of capturing an image of a subject identical with the subject while at least one of the image capturing angle of view and an attitude of the camera is changed as compared with its counterpart used for capturing the first captured image; and
wherein the first captured image obtaining means and the second captured image obtaining means are two image capture means which are independently provided in one camera and capable of simultaneously acquiring images of a single subject at different angles of view; and the first captured image and the second captured image are images which are simultaneously captured by the two image capture means.

10. A composition correction method comprising:
a rotation processing step of rotating a first captured image obtained by a first captured image means of capturing an image of a subject at a predetermined angle of view, on the basis of the attitude detected during capture of the first captured image in order to cause the image of the subject to stand in an erect position;
a compensation step of compensating for missing portions, where an images are absent in a predetermined image recording area due to rotation of the first captured image, on the basis of a second captured image obtained by capturing an image of a subject identical with that of the first captured image while at least one of an image capturing angle of view and a attitude of the camera is changed as compared with its counterpart employed for capturing the first captured image;
second captured image obtaining means for acquiring a second captured image by means of capturing an image of a subject identical with the subject while at least one of the image capturing angle of view and an attitude of the camera is changed as compared with its counterpart used for capturing the first captured image; and
wherein the first captured image obtaining means and the second captured image obtaining means are two image capture means which are independently provided in one camera and capable of simultaneously acquiring images of a single subject at different angles of view; and the first captured image and the second captured image are images which are simultaneously captured by the two image capture means.

* * * * *

UNITED STATES PATENT AND TRADEMARK OFFICE
CERTIFICATE OF CORRECTION

PATENT NO. : 7,590,335 B2
APPLICATION NO. : 11/536226
DATED : September 15, 2009
INVENTOR(S) : Masao Kobayashi et al.

Page 1 of 1

It is certified that error appears in the above-identified patent and that said Letters Patent is hereby corrected as shown below:

Col. 14, line 21    In Claim 1, before "predetermined" insert --a--.

Col. 14, line 45    In Claim 1, delete "we" and insert --are--.

Signed and Sealed this

Third Day of November, 2009

David J. Kappos
*Director of the United States Patent and Trademark Office*